United States Patent [19]

Buschmann et al.

[11] 4,072,887

[45] Feb. 7, 1978

[54] APPARATUS FOR ADJUSTING THE MUTUAL DISTANCES OF SEVERAL ELEMENTS ARRANGED SIDE BY SIDE, PARTICULARLY PAIRS OF BLADES FOR THE STRAIGHT-LINE CUTTING OF SHEET MATERIAL

[75] Inventors: Gerhard Buschmann, Dusseldorf; Reinhard Spohr, Dusseldorf-Nord, both of Germany

[73] Assignee: Jagenberg-Werke AG, Dusseldorf, Germany

[21] Appl. No.: 652,930

[22] Filed: Jan. 27, 1976

[30] Foreign Application Priority Data

July 11, 1974 Germany .............................. 2433302

[51] Int. Cl.² ............................................. G05B 11/01
[52] U.S. Cl. .................................... 318/675; 318/603; 83/11
[58] Field of Search ............... 318/625, 675, 587, 603; 83/11, 425.4, 425.3, 499, 508.3, 433

[56] References Cited

U.S. PATENT DOCUMENTS

| 3,646,418 | 2/1972 | Sterns et al. ........................ 318/603 |
| 3,734,257 | 9/1974 | Zumstein ................................ 83/11 |

Primary Examiner—Robert K. Schaefer
Assistant Examiner—John J. Feldhaus
Attorney, Agent, or Firm—Burgess, Dinklage & Sprung

[57] ABSTRACT

An apparatus for adjusting the mutual distance of several movable elements placed side by side wherein control means are provided to insure that the various movable elements move in a transposition operation, the same distance as determined by measuring means which measure the distance which a first movable element moves. The device includes means for repositioning the relative position of the movable elements such that following the repositioning operation, the various movable elements are maintained at a fixed relative distance from one another, the repositioning being conducted by measuring the distance by which a first movable elements moves and moving the related movable elements in response.

7 Claims, 3 Drawing Figures

APPARATUS FOR ADJUSTING THE MUTUAL DISTANCES OF SEVERAL ELEMENTS ARRANGED SIDE BY SIDE, PARTICULARLY PAIRS OF BLADES FOR THE STRAIGHT-LINE CUTTING OF SHEET MATERIAL

BACKGROUND OF THE INVENTION

1. Field of the Invention

This invention relates to an apparatus for adjusting the mutual distances of several movable elements placed side by side, particularly pairs of blades for straight-line cutting of sheet material. More particularly, this invention relates to an apparatus for adjusting and maintaining the mutual distances of several movable elements placed side by side such that following a cutting operation or other movement of the blades during transposition, the movable elements are moved at fixed relative distances such that the distance between successive movable elements is maintained. The invention also relates to a control device of the type described including means for repositioning the movable elements such that during repositioning the position of subsequent movable elements is adjusted by determining the extent to which a first movable element is moved from a fixed stop position. Stated differently, during a repositioning operation, the apparatus measures the extent to which a first movable element is moved from a fixed movable position. The apparatus then moves a second or downstream movable element the same distance by which the first movable element was moved. Subsequent movable elements are moved in response the same distance by which the first movable element is moved from the fixed stop position to its new position.

The invention is particularly directed to apparatuses of the type described provided with a feeler-controlled driving mechanism for each movable element and a control unit with which the new position of a movable element associated therewith can be adjusted. The feeler-controlled driving mechanisms feed the control impulses to the associated driving mechanism until the associated elements reaches the new position desired. This will be explained in greater detail below.

2. Discussion of the Prior Art

It has long been known to provide apparatuses which attempt to control the relative position of movable elements. With a known apparatus of this type, the control of the driving mechanism by which the elements are moved takes place in such a manner that signals generated by the action of a feeler feed an actual value into a control unit which is checked with a desired value. As long as there is a desired-actual value difference, the element is activated by the driving mechanism. In other words, the adjustment of the relative position is done by comparing the actual distance between movable elements with the desired distance. A signal is generated and at least one of the elements is moved until the apparatus detects no difference between the actual distance between the movable elements and the desired distance. Obviously, at such a point no adjustment in the relative position of the movable elements is required. Unfortunately, such an apparatus requires complex controls and requires means to compare a desired value with an actual value. Stated differently, various factors must be determined, to wit, the desired value and the actual value, and these must be compared. A signal must be generated as a result of the comparison which will actuated a driving mechanism. All of this is considered to be inordinately complex.

It therefore became desirable to provide an apparatus of this type by which the transposition or repositioning of the individual elements could take place without requiring such a comparison merely by measuring the extent to which a first movable element is moved and adjusting the other elements in response to such measurement. These and other objects are provided by the within invention as described below.

SUMMARY OF THE INVENTION

The objects of this invention are provided by an apparatus for adjusting and maintaining the mutual distances between a first movable element and a second movable element, wherein each of the movable elements are connected to a drive means therefor, each of the drive means, in turn, is connected to a control unit, which apparatus is improved in that the control unit comprises measuring means for measuring the distance a first movable element is moved by its corresponding drive means, the measuring means being operable to generate a signal and to feed the same to a distance travel regulating means, which distance travel regulating means is connected to the second drive means whereby the second element is moved during a transposition operation in the transposed direction precisely the same distance by which the first element is moved.

The device is preferably further improved by means which insure the establishment of the desired distance between a first movable element and a second movable element subsequent to a repositioning operation. In such event, the device is improved in that the first element has a sensor responsive to a fixed stop position. The second element in such instance also has a sensor which is responsive to a position of the first element. Each of the sensors is connected to the control, and each feeds a signal thereto. Each of the drive means is provided with a reverse phase, the control including a first reversing means for reversing the direction of travel of the drive means for the first movable element and controlling the distance by which said drive means, in response to a predetermined value, travels. The reversing means corresponding to the second movable element is attached to the second sensor and to the drive means for the second movable element and is responsive to the position of the first element, whereby when the second sensor is activated it generates a signal in said control means activating the second reversing means whereby the travel of the second element is reversed. The device includes means for measuring the repositioning distance, i.e., the distance the element moves subsequent to its movement in the reverse direction. Thus, the device measures the distance by which the first element moves from a fixed stop position to a new position corresponding to a predetermined value. A second reposition measuring means is provided which is connected to the second reversing means, this second repositioning means being connected to and responsive to the signal of the first reposition measuring means (which measures the distance between the fixed stop position and the new position of a first movable element), whereby to limit the reverse travel of the second element from the first element's new position so that it is precisely the distance between the fixed stop position and the new position of the first movable element.

The broad description of the invention above has been given in connection with an apparatus which has only two pairs of movable elements, e.g., cutters. Preferably, there are at least three pairs of movable elements, in which event the third movable element has a third drive means positioned side-by-side the second movable element, the drive means of the third movable element being connected to the control. Measuring means are connected to a second distance travel regulating means which, in turn, is connected to the third drive means whereby the third element is moved during a transposition operation precisely the same distance by which the first and second elements are moved.

Preferably, the third element has a third sensor responsive to the second element, the sensor of the third element being connected to the control and feeding a signal thereto. The drive means of the third element is preferably provided with a reverse phase, and the control includes a third reversing means attached to the third sensor and to the drive means of the third movable element, which reversing means is responsive to the position of the second element, whereby when the sensor of the third movable element is activated, it generates a signal in the control, activating the third reversing means whereby travel of the third element is reversed. The apparatus further comprises a third reposition measuring means connected to the third reversing means, the third repositioning means being connected to and responsive to the signal of the first reposition measuring means whereby to limit the reverse travel of the third element from the second element's new position so that it is precisely the distance between the fixed stop position and the new position.

The device can be better understood if one pictures what occurs in the cutting of a material, e.g., transversely. Cutters are positioned on a rail which can run parallel to the material to be severed. The cutters are movable transversely across the material to be severed in a severing operation. The cutters can also move parallel to the material along the rail. This occurs after a severing operation when it is desired to move the cutters once again so that they can cut additional material upstream from the initial cuts. In this way, the cutters work the entire distance of the rail. In this operation when the cutters are moved along the rail parallel to the material to be severed, the cutters are being "transposed." During a transposition operation, what is important is the distance between the cutters. This is important inasmuch as what is desired is that the material when severed have a precise dimension. Thus, the critical feature is the distance between, e.g., a first movable element and a second movable element. It is not critical precisely where the first movable element severs the material. It is only important that the cut material have the desired dimension, and that is determined by the distance between the first and second movable elements.

During a "repositioning" operation an adjustment is made to adjust the relative positions of the various cutting mechanisms. In the operation of the apparatus of the invention, a fixed stop position on the rail is determined. During repositioning, all of the cutters, e.g., movable elements 1, 2 and 3, move at about the same time toward the fixed stop position. When the cutter closest thereto engages the point of the fixed stop position, a signal causes the cutter to move in the opposite direction along the rail. When movable elements 2 and 3 engage the movable elements juxtaposed thereto, sensors therein cause the drive means connected therewith to go into a reverse phase, whereupon they also are caused to move in a direction away from the fixed position. Measuring means measure the distance by which the first cutter means moves from the fixed stop position. This information is fed into the control which causes the second movable element, i.e., the movable element juxtaposed to the first movable element, to move the precise distance away from the first movable element that the first movable element moves from the fixed stop position. Similarly, the third movable element moves the same distance away from the second movable element that the second movable element moves away from the first movable element. In operation, the second and third movable elements can be moving away from the first movable element while the first movable element is still being repositioned. In such instance, the control moves the second and third movable elements only a distance corresponding to the distance between the fixed stop position and the final new position of the first movable element. This means, in effect, that the second and third movable elements are moved a distance greater than the distance between the first movable element and their final position in that they engage the first movable element (or in the case of the third movable element, the second movable element) before the first movable element has reached its new position. However, the distance between the point that the second movable element engages the first movable element is nor recorded in the control. The control only records the entire distance that the first movable element has moved between the fixed stop position and its final new position and accordingly moves the second element so that the distance between the fixed final new position of the first element and the second element is the same as the distance between the fixed stop position and the final position of the first movable element.

The movement of the third movable element is analogous to the movement of the second movable element. This means that there is the precisely desired distance between the first movable element and the second movable element, on the one hand, and the second movable element and the third movable element on the other. The device does not depend upon the precise position of the first movable element on a rail or in relation to a material to be severed. The device totally regulates the mutual distances independently of the absolute position of the elements. This insures that where the movable elements are devices for severing fabric or the like, the material which is severed always has the desired dimension. Obviously, with such an apparatus a constant movement of the various movable elements and a comparison of the distance that the element has moved with a desired distance is not required. Furthermore, it is apparent that the device requires far fewer mechanical and/or electrical parts for its operation.

BRIEF DESCRIPTION OF DRAWINGS

Referring to the drawings herein.

DESCRIPTION OF THE INVENTION

Figure 1:
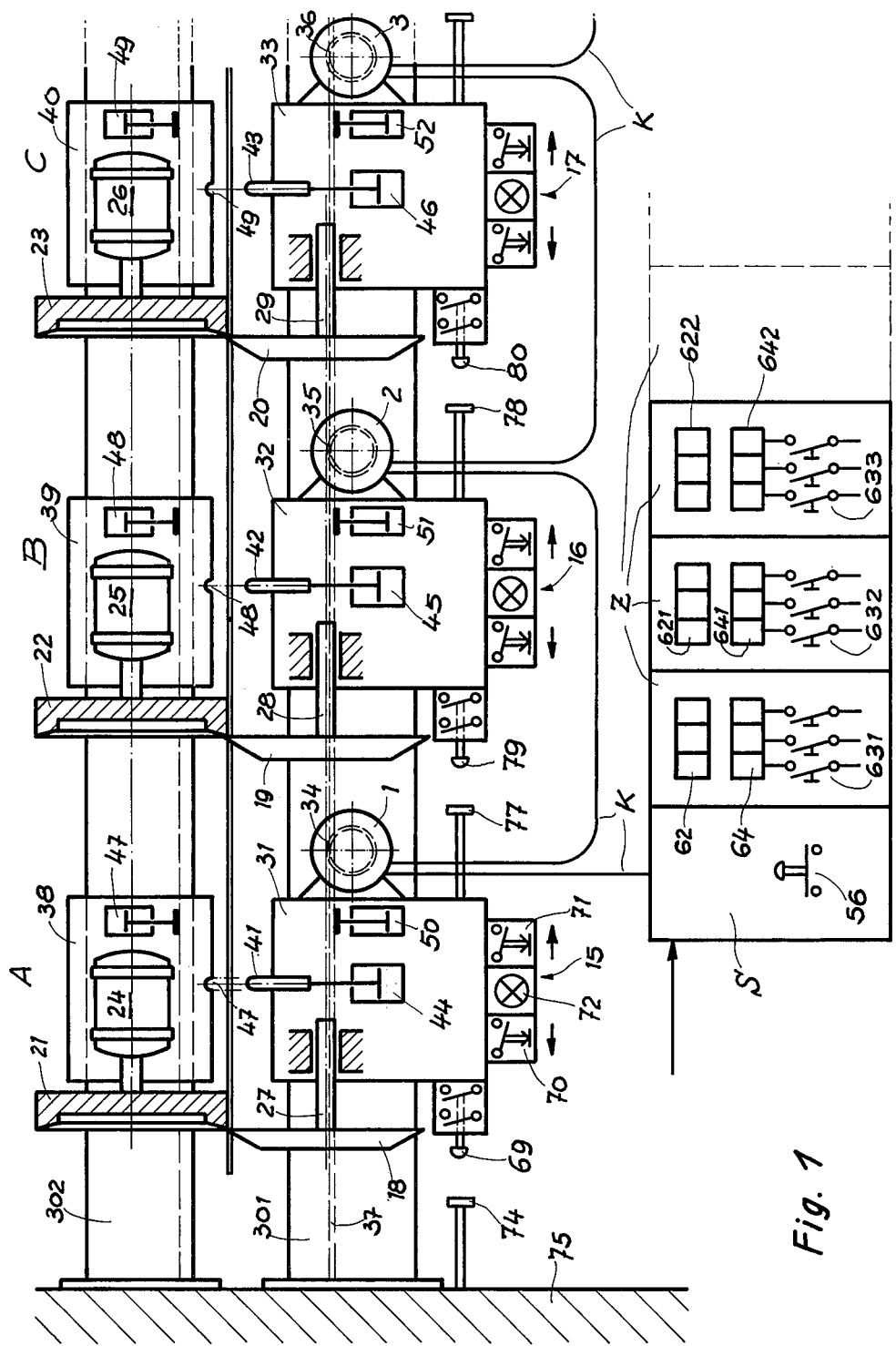
FIG. 1 is a top view of a longitudinal blade assembly according to the invention.

The objectives discussed above are reached according to the invention in that all driving mechanisms produce an impulse sequence proportional to the driving movement, and each element has an approach or end feeler which operates as a sensor for the adjoining element, while the control unit preferably comprises a calculator which, when the elements are being transposed, signals to the driving mechanism of each element, while taking into account the previous position of the movable element associated therewith and the new position of the previous movable element, e.g., movable element lower in line, the steps necessary for the new position of its corresponding movable element. In repositioning, the control causes, by means of the driving mechanism associated with all movable elements, all of the movable elements to proceed in the direction of a zero position which is fixed on the apparatus for the first movable element which can be denominated the element lowest in line. The elements move until the feeler of the element lowest in line has reached its fixed zero position (fixed stop position) and the feelers of the other elements have reached the element then lower in line. These feelers supply the control with a signal which is fed to the calculator to reverse the direction of the driving mechanism. During this operation the calculator signals, while taking into account the new position of the element then lower in line, the distance required for the new position to the driving mechanism of each element. Normally, the various driving elements are stepping motors wherein the calculator measures the number of steps required for the new position. Such information is fed to the driving mechanism of each element. Each element's driving mechanism has preferably the same stepping speed so that each element lower in line from the first movable element reaches its new position before the adjoining element higher in line when moving in the direction of the new position.

Suitable driving mechanisms are stepping motors which supply impulses to the calculator corresponding to the number of steps, the calculator being able to influence the feed of the impulses. The stepping speed of the individual driving mechanisms can be profitably adapted to each other in such a manner that it is the same for all driving mechanisms.

When repositioning, the control signal for the number of steps is preferably fed so that the calculator receives from the feeler of each element a starting signal to count the steps required for the new position relevant to the fixed zero position for the element lowest in line, i.e., the first movable element. Of course, a third movable element can be moved to correspond to the same distance by which a second movable element is moved from the first movable element, the final new position of the second movable element being equivalent to a fixed stop position. In such event, the control can be programmed to move the third movable element the same distance by which either the first or second movable element has moved. In all instances the positioning of the movable elements is such as to insure the proper mutual distance, regardless of the absolute position of the elements on a rail or the like. The calculator calculates the distance that the first movable element is moved as soon as the element leaves the fixed zero position. In the case of subsequently positioned movable elements, the calculator calculates the distance by which the subsequent movable element, e.g., second movable element, moves from the new position of the first movable element, and means are provided to limit its movement so that the distance between the first and second movable elements is exactly the distance between the fixed zero position and the first movable element.

The apparatus affords a precise and quick positioning whether this be a transpositioning or repositioning. Errors which could occur in positioning by having the elements proceed directly to a new position are largely eliminated in the repositioning operation, as the new position is determined each time by the new position of the first movable element. The result of a wrong positioning of one element is therefore of little importance in that the second and third movable elements are still maintained the desired distance away from the movable elements juxtaposed thereto. In such a case at most the distance to the adjoining elements is correct even though the precise positioning of all movable elements on the apparatus may be incorrect. Since in the repositioning all elements proceed simultaneously in the same direction toward the fixed stop position, there will be a shorter adjusting time in comparison with known apparatuses where the elements can only be adjusted in several directions successively by a common drive gear. When transposing, the adjusting time is even less because all elements can be adjusted simultaneously in the desired direction. This desired direction may be opposite.

DESCRIPTION OF SPECIFIC EMBODIMENTS

In FIG. 1, three straight-line cutting units A, B and C are shown in top view. These units consist each time of an upper and lower circular blade 18–20, the lower blades 21–23 resting on the journals of the blade motors 24–26 and being put in rotation by them. Each of the upper circular blades 18–20 rests on the free end of a shaft 27–29 which is at times arranged freely rotatably on a sliding carriage 31–33 movable on the traverse 301. The displacement of the cradles 31–33 takes place through stepping motors 1–3 which are connected formlockingly with a toothed rack 37 arranged on the traverse 301 always through a pinion 34–36.

For the simultaneous displacement of the lower circular blades 21–23, their cradles 38–40 movable on the lower blade traverse 302 are form-lockingly connected through tack bolts 41–43 by pushing the tack bolts through actuating means, for instance working cylinders 44–46, into corresponding stop slots 47–49 into the opposite cradle 38–40. However, before the adjusting process of the blade units A, B and C described below can take place, the clamping devices 47–49, as well as 50–52, must be loosened.

Figure 2:
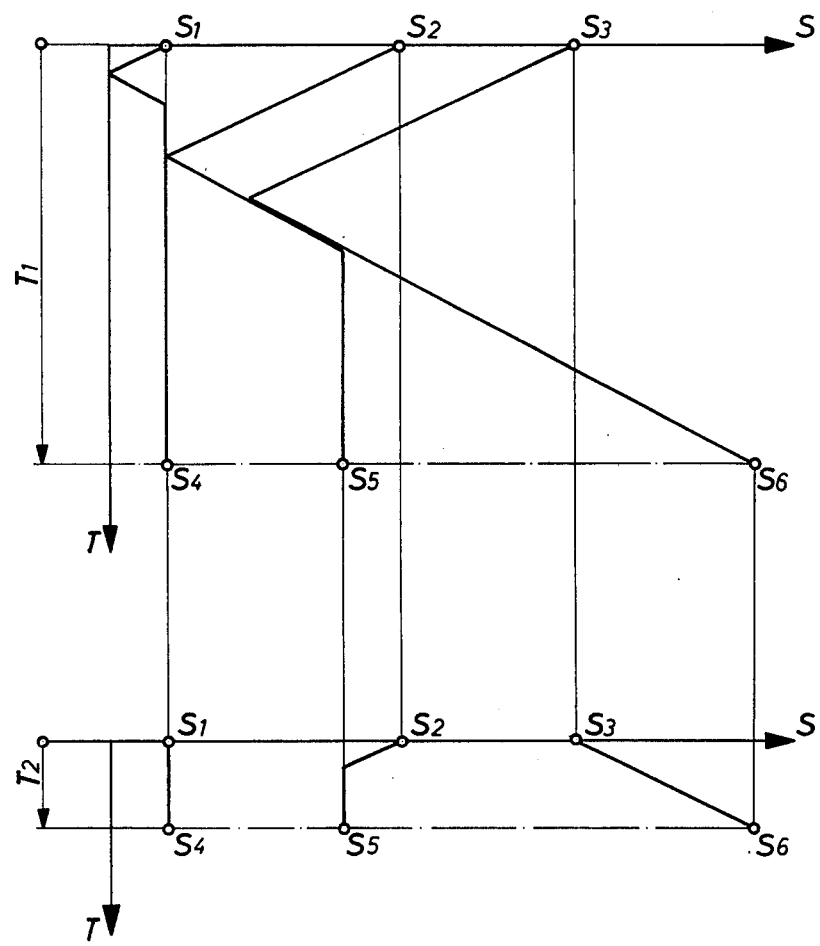
FIG. 2 is a graphical representation, in the upper area for a repositioning and in the lower area for a transpositioning.

In the control unit Z there is always indicated the actual position. Accordingly, the blade correlated with the stepping motor 1 stands at $S_1$ (FIG. 2) and the blade correlated with the stepping motor 2 at $S_2$ (FIG. 2) and the blade correlated with the stepping motor 3 at $S_3$ (FIG. 2). The numbers in the digital display 62 of FIG. 1 indicate the distance of an element to the next lower ranking element. The new position of the individual element can already be set into the preselected counter 63 during the operation.

Figure 3:
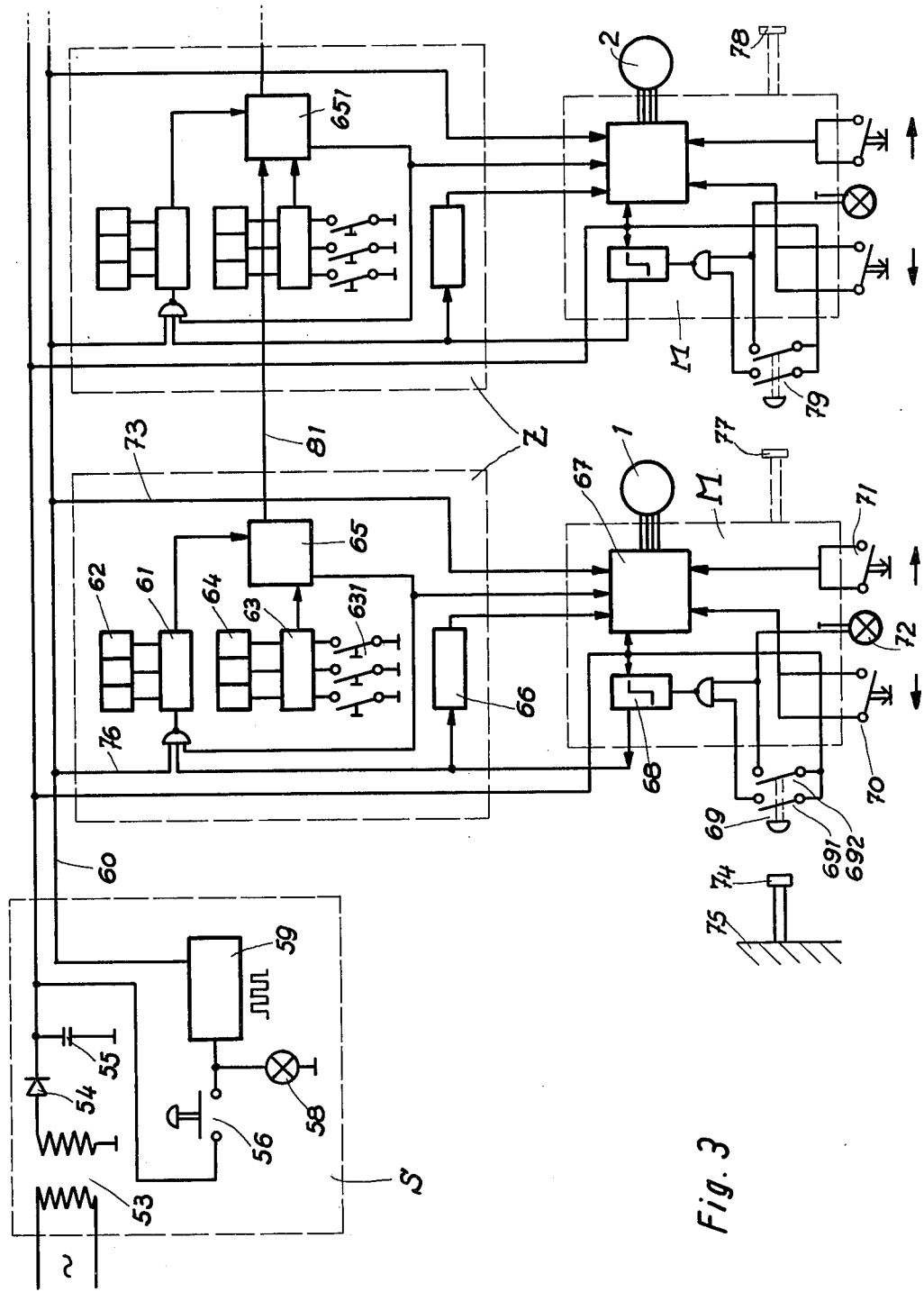
FIG. 3 is a circuit diagram for the electrical control of the blade unit.

The diagrammatic view of the electric motor of the blade units A, B and C in FIG. 3 shows on the left side the power supply S for the central control which is needed jointly for all blade units, which is joined on the right by the special control unit required for each blade unit, which is designated with Z (see also FIG. 1). These two units S and Z are in the switching box of the installation, whereas unit M shown in the lower picture of FIG. 3 is respectively on the blade units A, B and C.

The installations S and Z are connected with the units M on the respective cradle by movable cables, so-called trailing cables K of FIG. 1.

Referring to FIG. 3, in unit S there is a transformer 53, a converter 54, as well as a condenser 55, which supply a suitable low voltage direct current for the operation of the device according to the invention. In addition, a lever switch 56 is in the unit S by which the positioning process can be switched on and off, the particular switch position being indicated by a lamp 58. An additional essential building block of this unit S in the impulse generator 59 which supplies continuously uniform impulses to the control unit Z when in the operational stage.

The unit Z consists of a counter 61 for the actual format with a digital indicator 62, as well as a hand-operated preset counter 63 which also has a digital indicator 64. The switches 631 serve for the presetting of the desired format. In addition, in unit S there still are a reference input element 65 and a directional control unit 66.

In the electronic control unit M which is at times on the blade cradle 31, there is provided a power selection part 67 for the stepping motor 1 as well as an intermittent (skip, jump) stage 68. Furthermore, there is still in the control unit M the double end switch 69 for the automatic reversal of direction, as well as the sensors 70 and 71 for the manual operation which can be used for travel corrections of the stepping motor 1 in every direction. The control lamp 72 indicates the particular position of the end switches 69. In the example of the invention, this controls the distance between the element lowest in rank, at position $S_4$, which corresponds to the old position $S_1$, and the elements higher in rank including the next element at position $S_5$ which corresponds to old position $S_2$ and for the third element at the position $S_6$ corresponding to old position $S_3$, the distance being regulated according to the element lower in rank. These new positions $S_4$, $S_5$, $S_6$ can be obtained in two ways according to the invention.

NEW POSITIONING

If it is to be positioned newly, which is advisable when the old position is no longer fixed because of a disorder which occurred in the interim or when adjusting errors are to be kept as small as possible, then the corresponding push key 56 (FIG. 3) is pressed in the current supply S. Impulses of the impulse transmitter 59 are transmitted over the circuits 60 and 73 of the output control 67 for the step motor 1. This causes the stepping motor 1 (FIG. 1) to steer the knife carrier 31 to the left until the end switch 691 or 692 (FIG. 3) arrives at a stop 74 which is arranged for the left marginal blade 18 firmly at the edge of the machine 75, while the following blades 19, 20 on the particular blade rack 31 move therewith.

Through operation of the end switch 692 the polarity of direction of rotation of the stepping motor is reversed by the directional control unit 66 so that same now moves to the right. If the blade carrier 31 moves away from stop 74, then a release of the impulses for the counting is effected through the end switch 691. These counting impulses come over the circuit 60, 76 into the counter 61 which is connected with the format indicator 62 and it is counted until this counter 61 has the same number which was manually put into the preset counter 63, 64. The impulses put into the counter 61 were also supplied simultaneously to the control 67 of the stepping motor 1 over the circuits 60 and 73 so that the stepping motor 1 proceeds on the corresponding path to the right in accordance with the impulse number entered in the counter 61. If the preselected format was counted into the impulse counter 61, then a signal is transmitted over the input element 65 in the control unit Z for the stopping of the stepping motor 1. The additional input of counting impulses into the counter 6 is also stopped simultaneously.

This operation proceeds accordingly for all blade cradles 31-33. All blade cradles 31-33 go first to the left, the reversal of the direction of rotation takes place when the end switches 69, 79, 80 strike against the preceding or stationary stop 74, 77, 78. The counting of the impulses into the counter 61 takes place during the moving to the right of the step motors 1-3, i.e., when the blade cradle 31-33 or the end switch 69, 79, 80 has left the preceding stop 74, 77 or 78. A stopping takes place if the number of counting impulses corresponding to the preset counter 63 was counted into the counter 61.

REPOSITIONING

If it is certain that the old positions are still stored perfectly in the control unit and the new positions are to be reached as quickly as possible, the elements can be transported from the old positions $S_1$, $S_2$, $S_3$ directly to the new positions $S_4$, $S_5$, $S_6$. Here the old position of this element and the new position of the lower ranking element are considered in the calculator for the new position of an element by considering the old position of the lower ranking element and the steps for reaching the new position of this lower ranking element.

A comparison between the diagrams for new positioning and repositioning shows that the adjustment time $T_2$ for repositioning is substantially shorter than the adjustment time $T_1$ for new positioning.

As already described above, in control part Z there is a counter 61 belonging to the format indicator 62 and a counter 63 into which the preselection for the new format was put. It is determined in the reference input element 65 which reading is larger and the direction of rotation of the stepping motor 1 is fixed this way. The impulse counter 61 is filled up to the number which is in the format indicator 62 and the respective stepping motor 1 is transported by the same step according to the preselected direction of rotation. This rate of transport is put into the reference input element 651 of all the following pairs of blades 19/22, et seq., over the control 81. The next pair of blades 20/23 then moves this equivalent from the preceding blade 19/22, in addition to the difference which results from counting between the format indicator 622 and the preselection 642 for this blade. Derived from here, the blade 20/23 moves a certain number of steps to the left or to the right. This rate of transport is again put into the reference input from this blade to all following blades. This process continues in the switching sequence continuously up to the last pair of blades. The positioning movement of the individual pairs of blades then looks so that one starts the new position of the pair of blades directly from the old position. A collision of the individual pairs of blades with each other cannot take place since the motorized impulse takes place over the stepping motors from the joint impulse generator, i.e., with equal speed.

The sensor 70 and the sensor 71 with which the stepping motor 1 can be driven to the left or to the right by manual operation is still connected to the above-mentioned switching unit M which contains the output control 67. This control unit M also contains yet an intermittent stage 68 which switches the control unit of the end switch 69 intermittently and keeps in the switched state also when the switch 69 returns to the old position. In addition, a signal light 72 is yet provided schematically on this control unit M, which lights up upon actuation of the end switch 692 and indicates that this blade cradle 31 adjoins the left stop 74.

What is claimed is:

1. In an apparatus for adjusting and maintaining the mutual distances between a first movable element and a second movable element wherein each of said movable elements is connected to a drive means therefor, each of said drive means, in turn, is connected to a control unit, the improvement wherein said control unit comprises measuring means for measuring the distance said first element is moved by said first drive means, said measuring means operable to generate a signal and feed the same to a distance travel regulating means, said distance travel regulating means connected to said second drive means whereby said second element is moved, in transpositioning direction, precisely the same distance that said first element is moved, wherien said first element has a first sensor responsive to a fixed stop position, said second element has a second sensor responsive to said first element, each of said sensors connected to said control unit and to feed a signal thereto, each of said drive means is provided with a reverse phase, said control unit includes a first reversing means for reversing the direction of travel of said drive means and controlling the distance by which said drive means moves in response to a predetermined value, a second reversing means attached to said second sensor and to said second drive means and responsive to the position of said first element, whereby when said second sensor is activated it generates a signal in said control unit activating said second reversing means whereby the travel of said second element is reversed, first reposition measuring means which determines the distance by which said first element moves from said fixed stop position to its new position of predetermined value, and second reposition measuring means connected to said second reversing means, said second reposition measuring means connected to and responsive to the signal of said first reposition measuring means whereby to limit the reverse travel of said second element from the first element's new position so that it is precisely the distance between said fixed stop position and said new position.

2. An apparatus according to claim 1 wherein said apparatus further includes electric reposition commencement means electrically connected to said first and second drive means which, upon actuation, causes said first and second drive means to simultaneously move in the direction of said fixed stop position.

3. An apparatus according to claim 1 wherein said first and second drive means are stepping motors which have speeds such that upon reversal of said first and second drive means from their direction toward said first stop position said first drive means reaches its new position before said second drive means.

4. An apparatus according to claim 1 wherein said apparatus further includes a third movable element having a third drive means which movable element is positioned side-by-side said second movable element, said third drive means connected to said control unit, said measuring means connected to a second distance travel regulating means, said second distance travel regulating means connected to said third drive means whereby said third element is moved in transposed direction, precisely the same distance that said first and second elements are moved.

5. An apparatus according to claim 4 wherein said third element has a third sensor responsive to said second element, said third sensor is connected to said control unit and feeds a signal thereto, said third drive means is provided with a reverse phase, said control includes a third reversing means attached to said third sensor and to said third driving means and responsive to the position of said second element, whereby when said third sensor is activated, it generates a signal in said control unit activating said third reversing means whereby travel of said third element is reversed; said apparatus further comprising a third reposition measuring means connected to said third reversing means, said third reposition measuring means connected to and responsive to the signal of said first reposition measuring means whereby to limit the reverse travel of said third element from the second element's new position so that it is precisely the distance between said fixed stop position and said new position.

6. An apparatus according to claim 5 wherein said third drive means is a stepping motor and all stepping motors have the same stepping speed.

7. An apparatus according to claim 6 wherein the various reposition measuring means comprise a calculator, said first, second and third sensors are feelers, said feelers emit a signal to said calculator, the first feeler corresponds to the first sensor emitting a signal when the feeler is at the fixed stop position, the second feeler corresponding to the second sensor emitting a signal when the feeler engages the first element, the third feeler corresponding to the third sensor emitting a signal when it engages the second element.

* * * * *